US011200226B2

(12) United States Patent
Yu et al.

(10) Patent No.: US 11,200,226 B2
(45) Date of Patent: Dec. 14, 2021

(54) DATA READ AND WRITE METHOD AND APPARATUS, AND ELECTRONIC DEVICE

(71) Applicant: Advanced New Technologies Co., Ltd., George Town (KY)

(72) Inventors: Benquan Yu, Hangzhou (CN); Zhonghao Lu, Hangzhou (CN); Haizhen Zhuo, Hangzhou (CN); Faqiang Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/161,640

(22) Filed: Jan. 28, 2021

(65) Prior Publication Data

US 2021/0157798 A1 May 27, 2021

Related U.S. Application Data

(63) Continuation of application No. PCT/CN2019/114580, filed on Oct. 31, 2019.

(30) Foreign Application Priority Data

Dec. 20, 2018 (CN) .......................... 201811564466.9

(51) Int. Cl.
*G06F 16/23* (2019.01)
(52) U.S. Cl.
CPC ................ *G06F 16/2379* (2019.01)
(58) Field of Classification Search
USPC ........................................................ 707/703
See application file for complete search history.

(56) References Cited

U.S. PATENT DOCUMENTS 10,250,694 B2 * 4/2019 Mankovskii .......... H04L 67/142
10,614,239 B2 * 4/2020 Jacques de Kadt ........................
G06F 21/6227
(Continued)

FOREIGN PATENT DOCUMENTS

| CN | 108052321 | 5/2018 |
| CN | 108492180 | 9/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Cam Linh T Nguyen
(74) *Attorney, Agent, or Firm* — Fish & Richardson P.C.

(57) ABSTRACT

One or more embodiments of the present specification provide data retrieving and recording methods and apparatuses, and electronic devices. One method comprises: identifying, by a blockchain node in a blockchain network, a data retrieving and recording request for a smart contract, wherein the data retrieving and recording request is configured to trigger a data retrieving and recording operation on a target object in a data set comprised in the smart contract; and parsing, by the blockchain node and to generate a parsing result, metadata comprised in the smart contract, wherein the parsing performs instructions comprised in the smart contract, and wherein the parsing result indicates a storage field corresponding to the target object in the data set for implementing the data retrieving and recording operation on the storage field.

17 Claims, 5 Drawing Sheets

(56) References Cited

U.S. PATENT DOCUMENTS

| | | | |
|---|---|---|---|
| 10,698,675 B2* | 6/2020 | Bathen | G06F 8/65 |
| 10,713,963 B2* | 7/2020 | Darnell | G09B 7/02 |
| 10,871,948 B1* | 12/2020 | Dowling | G06F 8/311 |
| 10,897,499 B2* | 1/2021 | Diamanti | H04L 67/16 |
| 10,901,974 B2* | 1/2021 | Padmanabhan | H04L 9/006 |
| 2017/0005804 A1* | 1/2017 | Zinder | G06F 21/6254 |
| 2017/0048235 A1* | 2/2017 | Lohe | G06Q 20/065 |
| 2017/0085545 A1* | 3/2017 | Lohe | G06Q 20/065 |
| 2017/0236143 A1 | 8/2017 | Code et al. | |
| 2018/0039667 A1* | 2/2018 | Pierce | G06F 16/2379 |
| 2019/0108576 A1* | 4/2019 | LaPrade | G06Q 20/389 |
| 2019/0172057 A1* | 6/2019 | Vincent | G06Q 50/30 |
| 2020/0142682 A1* | 5/2020 | Marks | G06F 8/65 |
| 2020/0143337 A1* | 5/2020 | Conroy | G06Q 20/3829 |
| 2020/0195431 A1* | 6/2020 | Athmalingam | H04L 63/061 |

FOREIGN PATENT DOCUMENTS

| | | |
|---|---|---|
| CN | 108566420 | 9/2018 |
| CN | 108694589 | 10/2018 |
| CN | 108769173 | 11/2018 |
| CN | 108830720 | 11/2018 |
| CN | 110020542 | 7/2019 |
| CN | 110032598 | 7/2019 |
| GN | 107016548 | 8/2017 |
| GN | 107079059 | 8/2017 |
| GN | 107103054 | 8/2017 |
| GN | 107122364 | 9/2017 |
| GN | 107807991 | 3/2018 |
| GN | 108965399 | 12/2018 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/114580, dated Jan. 23, 2020, 10 pages (with partial English translation).

PCT International Preliminary Report on Patentability in International Application No. PCT/CN2019/114580, dated Jun. 16, 2021, 9 pages (with English translation).

* cited by examiner

DATA READ AND WRITE METHOD AND APPARATUS, AND ELECTRONIC DEVICE

CROSS-REFERENCE TO RELATED APPLICATIONS

This application is a continuation of PCT Application No. PCT/CN2019/114580, filed on Oct. 31, 2019, which claims priority to Chinese Patent Application No. 201811564466.9, filed on Dec. 20, 2018, and each application is hereby incorporated by reference in its entirety.

TECHNICAL FIELD

One or more embodiments of the present specification relate to the field of blockchain technologies, and in particular, to data read and write methods and apparatuses, and electronic devices.

BACKGROUND

Blockchain technology (also referred to as a distributed ledger technology) is a decentralized distributed database technology that features decentralization, openness, transparency, tamper resistance, and trustworthiness, and can be applied to many application scenarios that highly rely on data reliability.

SUMMARY

In view of this, one or more embodiments of the present specification provide data read and write methods and apparatuses, and electronic devices.

To achieve the previous objective, one or more embodiments of the present specification provide the following technical solutions:

According to a first aspect of one or more embodiments of the present specification, a data read and write method is proposed, including: obtaining, by a blockchain node in a blockchain network, a data read and write request for a smart contract, where the data read and write request is used to perform a data read and write operation on a target object in a data set included in the smart contract; and parsing, by the blockchain node, metadata included in the smart contract by running code included in the smart contract, where a parsing result is used to indicate a storage field corresponding to the target object in the data set so as to implement the data read and write operation on the storage field.

According to a second aspect of one or more embodiments of the present specification, a data read and write apparatus is proposed, including: an acquisition unit, configured to enable a blockchain node in a blockchain network to obtain a data read and write request for a smart contract, where the data read and write request is used to perform a data read and write operation on a target object in a data set included in the smart contract; and a parsing unit, configured to enable the blockchain node to parse metadata included in the smart contract by running code included in the smart contract, where a parsing result is used to indicate a storage field corresponding to the target object in the data set so as to implement the data read and write operation on the storage field.

According to a third aspect of one or more embodiments of the present specification, an electronic device is proposed, including: a processor; and a memory, configured to store an instruction executable by the processor, where the processor is configured to implement the data read and write method according to any one of the previous embodiments.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the example embodiments below do not represent all implementations consistent with one or more embodiments of the present specification. On the contrary, the implementations are only examples of apparatuses and methods that are described in the appended claims in detail and consistent with some aspects of one or more embodiments of the present specification.

Notably, steps of a corresponding method in other embodiments are not necessarily performed in a sequence shown and described in the present specification. In some other embodiments, the method can include more or less steps than steps described in the present specification. In addition, a single step described in the present specification may be divided into multiple steps for description in other embodiments; and multiple steps described in the present specification may be combined into a single step for description in other embodiments.

Figure 1:
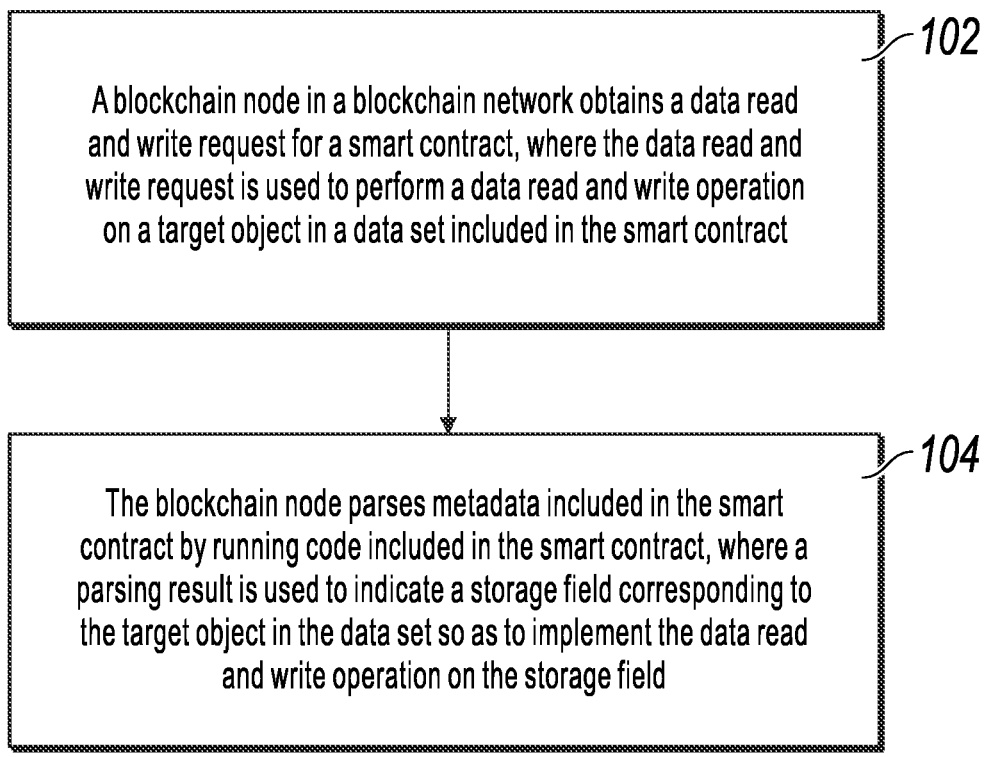
FIG. 1 is a flowchart illustrating a data read and write method, according to some example embodiments.

FIG. 1 is a flowchart illustrating a data read and write method, according to some example embodiments. As shown in FIG. 1, the method can include the following steps.

Step 102: A blockchain node in a blockchain network obtains a data read and write request for a smart contract, where the data read and write request is used to perform a data read and write operation on a target object in a data set included in the smart contract.

In some embodiments, a data read and write request can be included in a transaction created in a blockchain network. By specifying a contract address and port information, etc. of a smart contract that needs to be invoked in the transaction, the data read and write request is identified as "dedicated to" the above-mentioned smart contract, so that data read and write can be performed on a data set included in the smart contract.

In some embodiments, a transaction (transaction) described in the present specification refers to a piece of data that is created by using a client device corresponding to a blockchain node and that needs to be finally published to a distributed database of the blockchain network. A transaction in a blockchain network can be a transaction in a narrow sense and a transaction in a broad sense. A transaction in the narrow sense refers to a value transfer published to a blockchain network. For example, in a conventional bitcoin blockchain network, a transaction can be a transfer initiated in the blockchain network. A transaction in the broad sense refers to a piece of service data that is published to a blockchain network and that has a service intention. For example, an operator can establish a consortium blockchain based on an actual service needs, and deploy some other types of online services (for example, a house rental service, a vehicle dispatch service, an insurance claims service, a credit service, and a medical service) that are unrelated to a value transfer in the consortium blockchain. In such a consortium blockchain, a transaction can be a service message or a service request that is published in the consortium blockchain and that has a service intention.

In some embodiments, the data read and write request in the present specification can be included in the previous transaction in the narrow sense. For example, the data set included in the smart contract records a blockchain balance of each user, and the transaction is used to perform a read and write operation on a blockchain balance of one or more users.

In some embodiments, the data read and write request in the present specification can be included in the previous transaction in the broad sense. For example, the data set included in the smart contract records credit data of each user, and the transaction is used to perform a read and write operation on credit data of one or more users.

In some embodiments, the smart contract can include several structures, such as a code structure for recording code and a storage structure for recording data sets and metadata. In other embodiments, code, data sets, and metadata can be recorded in other structures in the smart contract. Implementations are not limited in the present specification.

In some embodiments, an initiator of the data read and write request can include a blockchain member in the blockchain network. A role of the blockchain member can be fulfilled by a person, an enterprise organization, or a platform, etc. A corresponding operation, for example, initiation of the previous data read and write request, can be performed in the blockchain network based on the role of the "blockchain member".

In some embodiments, the initiator of the data read and write request can include another smart contract that is different from the smart contract. For example, performing contract operations based on the another smart contract includes reading of related data from or writing of related data to the data set of the smart contract. As such, the contract operations based on the another smart contract can initiate the previous data read and write request to implement a corresponding data read and write operation. The another smart contract can be invoked by a blockchain member or yet another smart contract. Implementations are not limited in the present specification.

Step 104: The blockchain node parses metadata included in the smart contract by running code included in the smart contract, where a parsing result is used to indicate a storage field corresponding to the target object in the data set so as to implement the data read and write operation on the storage field.

In some embodiments, because metadata for the data set has been added to the smart contract, updating the data set directly will not be necessary when a field update is needed for the data in the data set. Instead, only the metadata needs to be updated so the previous field update can be implemented on the data set after the code is run to parse the metadata.

In some embodiments, the metadata for the data set is added to the smart contract, so that a data read and write operation is not directly performed on the data set when the code is run. Instead, the storage field of the target object in the data set is determined by parsing the metadata, and then a data read and write operation is performed on the storage field.

In some embodiments, the blockchain node can read input parameters included in the data invoking request. The input parameters include the target object. The data read and write operation is used to read a field value in the storage field so as to return the field value to an initiator of the data invoking request. For example, when user A needs to transfer a specified amount of a blockchain asset to user B, the target object can be a blockchain balance of user A. After a storage field corresponding to "the blockchain balance of user A" in the data set is determined by parsing the metadata, a corresponding value of the blockchain balance can be read from the storage field. When the value is greater than the specified amount, the blockchain asset transfer operation is allowed, or otherwise, the blockchain asset transfer operation can be rejected.

In some embodiments, the blockchain node can read input parameters included in the data read and write request. The input parameters include the target object and a value of the target object. The data read and write operation is used to update a field value in the storage field based on the value of the target object. For example, when user A needs to transfer a specified amount of a blockchain asset to user B, the target object can be a blockchain balance of user B. After a storage field corresponding to "the blockchain balance of user B" in the data set is determined by parsing the metadata, the blockchain balance read from the storage field can be updated to a sum of a value of the blockchain balance and the previous specified amount, so that the blockchain asset transfer operation is completed. For another example, when user A needs to transfer a specified amount of a blockchain asset to user B, the target object can be a blockchain balance of user B, and the value of the target object can be a value of the blockchain balance obtained after the transfer is completed. After a storage field corresponding to "the blockchain balance of user B" in the data set is determined by parsing the metadata, a field value in the storage field can be updated to the value of the target object.

In some embodiments, the blockchain node can respond to the data read and write request when the data read and write request satisfies an invoking condition of the smart contract so as to return target data. For example, the invoking condition can include the following: An initiator user corresponding to the data read and write request has an invoking permission for the smart contract. As such, on one hand, data can be written to the data set included in the smart contract and published to the blockchain network, so that the blockchain node can perform a read and write operation on related data; on the other hand, permission isolation can be performed on the data set based on the invoking permission, and an unauthorized blockchain node can be prevented from accessing or editing the data set, thereby reducing a contradiction between data read and write convenience and data security.

Figure 2:
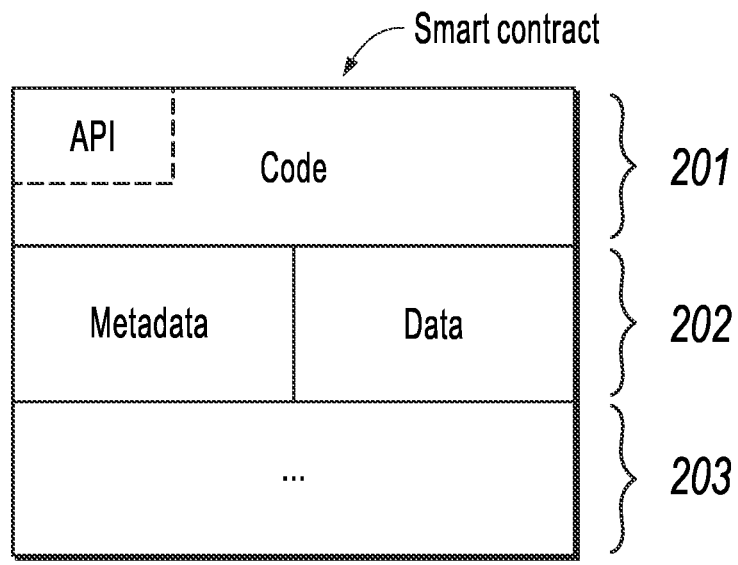
FIG. 2 is a schematic diagram illustrating a data structure of a smart contract, according to some example embodiments.

FIG. 2 is a schematic structural diagram illustrating a smart contract, according to some example embodiments. As shown in FIG. 2, in the embodiments of the present specification, a structural improvement is carried out for the smart contract in the blockchain network to implement a data read and write solution based on the present specification. The smart contract can include a structure 201. For example, the structure 201 can be referred to as a code structure, and is used to record contract code (referred to as code for short) of the smart contract. The smart contract can include a structure 202. For example, the structure 202 can be referred to as a storage structure, and is used to record contract data (referred to as data for short) in the smart contract and metadata corresponding to the contract data. The metadata is used to describe the corresponding contract data. The smart contract can further include other structures 203, such as a balance structure and a nonce structure in related technologies. Implementations are not limited in the present specification. The smart contract can externally provide an application programming interface (API) for contract code in the structure 201 so as to invoke the contract code.

Figure 3:
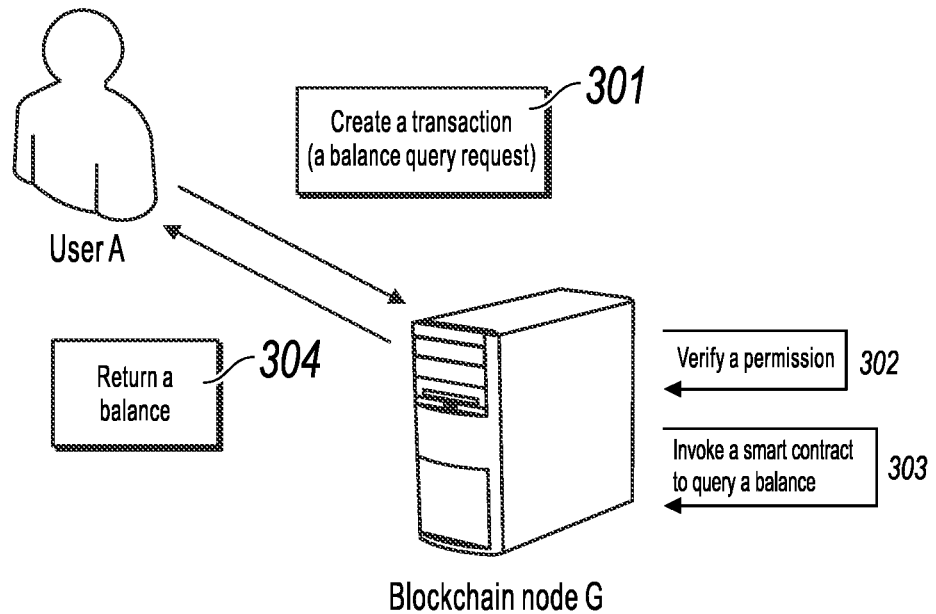
FIG. 3 is a schematic diagram illustrating querying a blockchain balance, according to some example embodiments.

A data read and write solution of the present specification can be implemented based on the smart contract in the data structure shown in FIG. 2. The following describes in detail the data read and write solution based on the present specification by using a query operation for a blockchain balance as example. FIG. 3 is a schematic diagram illustrating querying a blockchain balance, according to some example embodiments. As shown in FIG. 3, a process of querying a blockchain balance can include the following steps:

Step 301: Create a transaction.

In some embodiments, assuming that user A needs to query a blockchain asset owned by user A in the blockchain network, namely, a blockchain balance of user A, user A can create a balance query transaction (which is equivalent to a balance query request), and publish the transaction to the blockchain network. Assume that blockchain node G responds to the previous transaction published by user A. Blockchain node G is generally a blockchain node closest to user A. Certainly, implementations are not limited in the present specification.

In some embodiments, blockchain balance data of all users in the blockchain network is recorded in smart contract S. For example, when smart contract S uses the data structure shown in FIG. 2, the blockchain balance data can be recorded in a storage structure of smart contract S. After being created and published to the blockchain network, smart contract S reaches a consensus between blockchain nodes in the blockchain network, and is recorded on each blockchain node. For example, smart contract S is also recorded on blockchain node G described above.

In some embodiments, many smart contracts can exist in a blockchain network for implementing corresponding events or purposes. Therefore, the previous transaction can include a contract address and port information, etc. of smart contract S. As such, blockchain node G can determine, based on the contract address, that the transaction needs to invoke smart contract S, and invoke, based on the port information, contract code included in smart contract S so as to implement operations such as a blockchain balance query.

Step 302: Blockchain node G verifies a data access permission of user A on the blockchain balance.

In some embodiments, smart contract S can set a data access permission in a form similar to a whitelist or a blacklist to prevent a security risk caused by unauthorized access to data such as a blockchain balance. For example, when the blockchain network belongs to a public blockchain, users with the data access permission can be a predetermined group of users. For another example, when the blockchain network belongs to a consortium blockchain, users with the data access permission can be consortium members. Therefore, when blockchain node G obtains the transaction published by user A and determines that the transaction needs to query data of smart contract S, blockchain node G can first determine whether user A has the corresponding data access permission, and continue a subsequent step when user A has the permission. Otherwise, blockchain node G can return failure information.

Notably, based on features of distributed data storage of a blockchain network, data published to the blockchain network needs to be recorded on all blockchain nodes, so that the data cannot be tampered with and is traceable. However, for data that may be private to some extent such as the previous blockchain balance, privacy may not be ensured if the data is published to the blockchain network. However, if the data is not published to the blockchain network, the data may be unreliable and it is not conducive for each blockchain node to conveniently read and invoke related data. Therefore, in the present specification, the previous data with a privacy need is recorded in a smart contract, and unauthorized access to the related data by an unauthorized user can be limited through management of data access permissions. As such, the data can be published to the blockchain network to ensure reliability and convenience brought by the blockchain network while sufficient privacy and security are ensured for the data.

Step 303: When user A has the data access permission, blockchain node G queries the balance by invoking the previous smart contract.

In some embodiments, user A can specify related information about a blockchain balance that needs to be queried in the transaction. For example, when user A wants to query a blockchain balance of user A, the related information can include an account ID and an asset type, etc. of user A. Blockchain node G can invoke contract code in the code structure in smart contract S to parse metadata in the storage structure in smart contract S by running the contract code, so as to determine a storage field corresponding to the previous related information specified in the transaction.

TABLE 1

| Account ID | Age | Tel | ... | Balance-Type A | Balance-Type B | Total-RMB |
|---|---|---|---|---|---|---|
| 0001 | 26 | 139 ... | ... | 2000 | 1500 | 5000 |
| 0002 | 25 | 186 ... | ... | 1000 | 6000 | 13000 |
| 0003 | 32 | 166 ... | ... | 20000 | 2100 | 24200 |
| ... | ... | ... | ... | ... | ... | ... |

In some embodiments, assume that smart contract S records the data described in Table 1, including personal information (such as an account ID, an age, and an address) of a user owning each account, a balance of a blockchain asset owned by each account, and the total amount of all blockchain balances counted in RMB, etc.

For example, when the account ID of user A in the blockchain network is "0003" and an asset type specified in the transaction is "type B", blockchain node G can invoke the contract code included in smart contract S. As such, after the contract code is run and the metadata included in smart contract S is parsed, storage fields of "account ID=0003" and "asset type=type B" can be determined, and a value read from the storage field is "2100", that is, a type B blockchain balance owned by user A is 2100.

Step 304: Blockchain node G returns a queried balance to user A.

Figure 4:
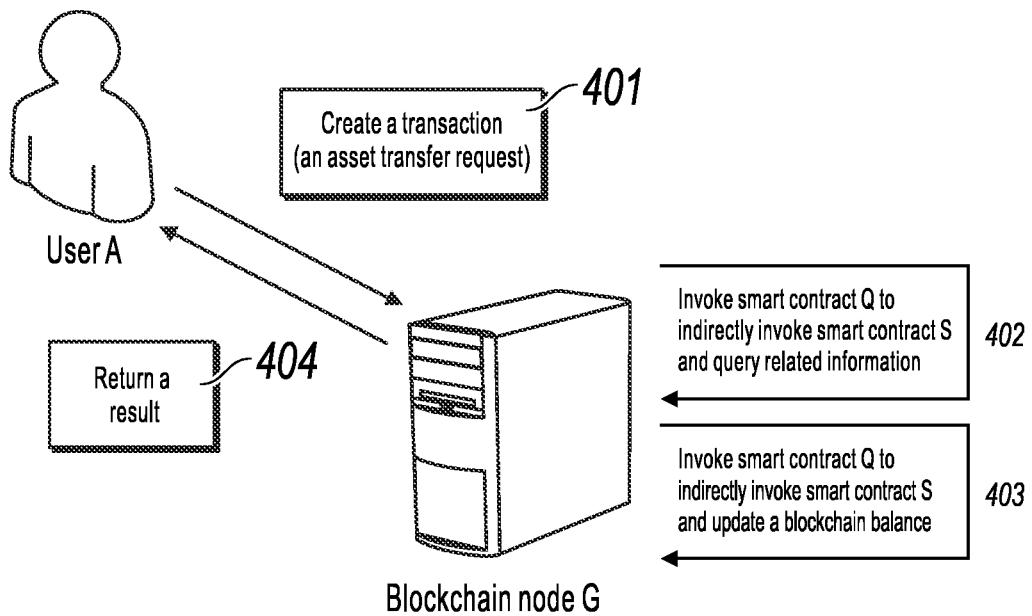
FIG. 4 is a schematic diagram illustrating a blockchain asset transfer, according to some example embodiments.

The following describes in detail the data read and write solution based on the present specification by using an asset transfer operation for a blockchain asset as example. FIG. 4 is a schematic diagram illustrating a blockchain asset transfer, according to some example embodiments. As shown in FIG. 4, a process of transferring a blockchain asset can include the following steps:

Step 401: Create a transaction.

In some embodiments, assuming that user A owns a certain blockchain asset in the blockchain network, and user A wants to transfer at least a portion of the blockchain asset to user B, user A can create a blockchain asset transfer transaction (which is equivalent to an asset transfer request), and publish the transaction to the blockchain network. Assume that blockchain node G responds to the previous transaction published by user A. Blockchain node G is generally a blockchain node closest to user A. Certainly, implementations are not limited in the present specification.

In some embodiments, assume that a blockchain asset transfer function is implemented by smart contract Q. Blockchain node G can invoke and run contract code recorded by smart contract Q in a code structure to implement the blockchain asset transfer function. For example, user A states in the previous transaction that user A wants to transfer a type B blockchain asset to user B and a transfer amount is 1000. In this case, the following needs to be determined for smart contract Q during the asset transfer operation: An amount of the type B blockchain asset owned by user A is not less than 1000, and user B has a real valid account in the blockchain network.

Step 402: Blockchain node G invokes smart contract Q to indirectly invoke smart contract S and query related information.

In some embodiments, user A can specify an account ID of an asset transferee (the account ID of user A), an account ID of an asset transferor (an account ID of user B), a type of an asset to be transferred (type B), and a transfer amount (1000) in the transaction. Then, when the contract code included in smart contract Q is run, another transaction can be created and be published to the blockchain network based on the previous verification needs for the blockchain balance and account authenticity, etc. The contract address and the port information, etc. of smart contract S are specified in the transaction, so that the previous needs can be satisfied by invoking smart contract S.

In some embodiments, assume that blockchain node G responds to the above-mentioned transaction published by smart contract Q. Similar to the embodiment shown in FIG. 3, blockchain node G can invoke and run the contract code in the code structure in smart contract S to parse the metadata in the storage structure in smart contract S, so as to determine (1) whether the type B blockchain balance owned by user A is not less than 1000, and (2) whether the account information of user B is authentic and valid.

The data described in Table 1 is still used as an example. Assuming that the account ID of user A in the blockchain network is "0003" and an asset type specified in the transaction is "type B", blockchain node G can invoke the contract code included in smart contract S, so that after the contract code is run and the metadata included in smart contract S is parsed, storage fields of "account ID=0003" and "asset type=type B" can be determined, and a value read from the storage field is "2100", that is, the type B blockchain balance owned by user A is 2100, satisfying the requirement that the type B blockchain balance owned by user A is not less than 1000.

In some embodiments, assuming that the account ID of the asset transferee specified by user A in the transaction is "0001", blockchain node G can invoke the contract code included in smart contract S, so after the contract code is run and the metadata included in smart contract S is parsed, a related field with "account ID=0001" can be determined, and it can be determined that the account information of user B is authentic and valid.

Step 403: The blockchain node invokes smart contract Q to indirectly invoke smart contract S and update the blockchain balance.

In some embodiments, if it is determined, based on a query result returned in step 403, that smart contract Q can implement the asset transfer operation requested by user A, a transaction can be created and published to the blockchain network, and the transaction specifies the contract address and the port information, etc. of smart contract S, so that smart contract S can be invoked to update a blockchain balance of a related account after the asset transfer is completed.

In some embodiments, assume that Table 1 describes the data originally recorded smart contract S, where the account ID corresponding to user A is "0003", the blockchain balance of asset type B owned by user A is 2100, the total asset amount owned by user A is equal to RMB 24,200 (assuming that an exchange ratio of a type A blockchain asset to RMB is 1:1 and an exchange ratio of a type B blockchain asset to RMB is 1:2), the account ID corresponding to user B is "0001", a blockchain balance of asset type B owned by user B is 1500, and the total asset amount owned by user B is equal to RMB 5000.

If the type B blockchain asset with the amount of 1000 owned by user A is transferred to user B, the blockchain balance of asset type B corresponding to the account ID "0003" is updated to 1100 and the total asset amount owned by user A is updated to RMB 22,200, the blockchain balance of asset type B corresponding to the account ID "0001" is updated to 2500 and the total asset amount owned by user B is updated to RMB 7000. Table 2 describes the related data.

TABLE 2

| Account ID | Age | Tel | ... | Balance-Type A | Balance-Type B | Total-RMB |
|---|---|---|---|---|---|---|
| 0001 | 26 | 139 ... | ... | 2000 | 2500 | 7000 |
| 0002 | 25 | 186 ... | ... | 1000 | 6000 | 13,000 |
| 0003 | 32 | 166 ... | ... | 20,000 | 1100 | 22,200 |
| ... | ... | ... | ... | ... | ... | ... |

In one case, smart contract Q can specify the following in the transaction published in step 403: The blockchain balance of asset type B corresponding to the account ID "0003" needs to be reduced by 1000, and the blockchain balance of asset type B corresponding to the account ID "0001" needs to be increased by 1000. After the contract code included in smart contract S is run, corresponding storage fields are automatically determined, including: a storage field corresponding to "account ID=0003" and "asset type=type B", a storage field corresponding to "account ID=0003" and "total amount", a storage field corresponding to "account ID=0001" and "asset type=type B", and a storage field corresponding to "account ID=0001" and "total amount". Further, a value of the storage field corresponding to "account ID=0003" and "asset type=type B" is updated from 2100 to 1100 after the reduction, a value of the storage field corresponding to "account ID=0003" and "total amount" is updated from RMB 24,200 to RMB 22,200, a value of the storage field corresponding to "account ID=0001" and "asset type=type B" is updated from 1500 to 2500 after the increase, and a value of the storage field corresponding to "account ID=0001" and "total amount" is updated from RMB 5000 to RMB 7000.

In another case, smart contract Q can specify the following in the transaction published in step 403: The blockchain balance of asset type B corresponding to the account ID 0003 needs to be updated to 1100, and the total amount needs to be updated to RMB 22200; and the blockchain balance of asset type B corresponding to the account ID 0001 needs to be updated to 2500, and the total amount needs to be updated to RMB 7000. After the contract code included in smart contract S is run, corresponding storage fields are automatically determined, including: a storage field corresponding to "account ID=0003" and "asset type=type B", a storage field corresponding to "account ID=0003" and "total amount", a storage field corresponding to "account ID=0001" and "asset type=type B", and a storage field corresponding to "account ID=0001" and "total amount". Further, a value of the storage field corresponding to "account ID=0003" and "asset type=type B" is updated to 1100, a value of the storage field corresponding to "account ID=0003" and "total amount" is updated to RMB 22,200, a value of the storage field corresponding to "account ID=0001" and "asset type=type B" is updated to 2500, and a value of the storage field corresponding to "account ID=0001" and "total amount" is updated to RMB 7000.

Step 404: Blockchain node G returns a result to user A.

In the embodiment shown in FIG. 3, user A publishes the transaction to the blockchain network to invoke the contract code included in smart contract S, and read (query) the data included in smart contract S based on the result of parsing the metadata included in smart contract S based on the contract code. In other embodiments, operations such as reading a blockchain balance can alternatively be implemented in a method similar to the method shown in FIG. 4, to be specific, implemented based on indirect invoking between multiple smart contracts.

In the embodiment shown in FIG. 4, user A publishes the transaction to the blockchain network to directly invoke smart contract Q, so that smart contract Q invokes the contract code included in smart contract S during implementation of related logic so as to read (query) the data from and write (updates) data to smart contract S based on the result of parsing the metadata included in smart contract S based on the contract code. In other embodiments, operations such as reading and updating a blockchain balance can alternatively be implemented in a method similar to the method shown in FIG. 3, to be specific, implemented based on a user's direct invoking of a smart contract.

Figure 5:
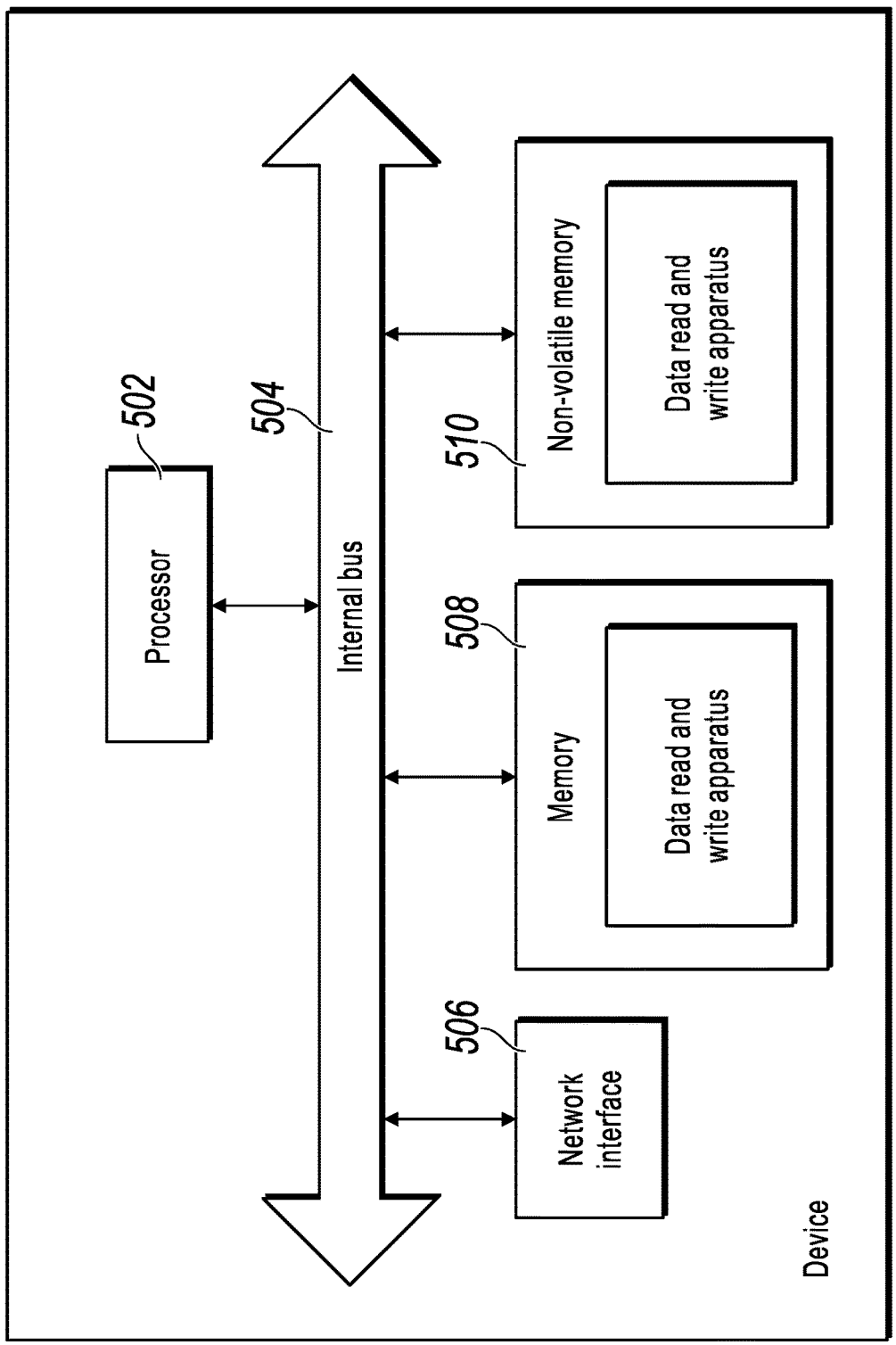
FIG. 5 is a schematic structural diagram illustrating a device, according to some example embodiments.

FIG. 5 is a schematic structural diagram illustrating a device, according to some example embodiments. Referring to FIG. 5, in terms of hardware, the device includes a processor 502, an internal bus 504, a network interface 506, a memory 508, and a non-volatile memory 510, and certainly can further include hardware needed by other services. The processor 502 reads a corresponding computer program from the non-volatile memory 510 to the memory 508 for running, and a data read and write apparatus is logically formed. Certainly, in addition to a software implementation, one or more embodiments of the present specification do not exclude another implementation, for example, a logic device or a combination of hardware and software. That is, an execution body of the following processing procedure is not limited to each logical unit, and can also be hardware or a logic device.

Figure 6:
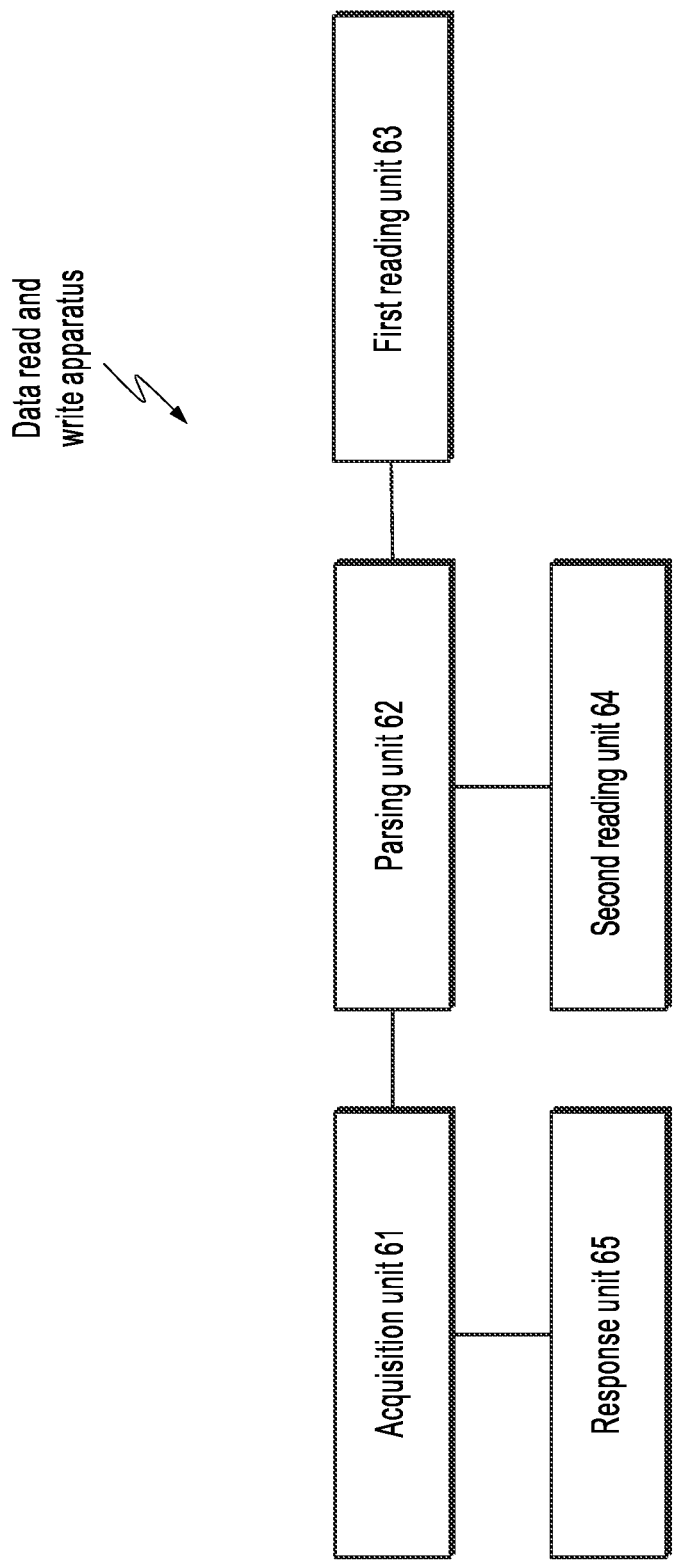
FIG. 6 is a block diagram illustrating a data read and write apparatus, according to some example embodiments.

Referring FIG. 6, in a software implementation, the data read and write apparatus can include the following: an acquisition unit 61, configured to enable a blockchain node in a blockchain network to obtain a data read and write request for a smart contract, where the data read and write request is used to perform a data read and write operation on a target object in a data set included in the smart contract; and a parsing unit 62, configured to enable the blockchain node to parse metadata included in the smart contract by running code included in the smart contract, where a parsing result is used to indicate a storage field corresponding to the target object in the data set so as to implement the data read and write operation on the storage field.

Optionally, the data read and write apparatus further includes the following: a first reading unit 63, configured to enable the blockchain node to read input parameters included in the data invoking request, where the input parameters include the target object; where the data read and write operation is used to read a field value in the storage field so as to return the field value to an initiator of the data invoking request.

Optionally, the data read and write apparatus further includes the following: a second reading unit 64, configured to enable the blockchain node to read input parameters included in the data read and write request, where the input parameters include the target object and a value of the target object; where the data read and write operation is used to update a field value in the storage field based on the value of the target object.

Optionally, an initiator of the data read and write request includes a blockchain member in the blockchain network, or another smart contract that is different from the smart contract.

Optionally, the data read and write apparatus further includes the following: a response unit 65, configured to enable the blockchain node to respond to the data read and write request when the data read and write request satisfies an invoking condition of the smart contract so as to return target data.

Optionally, the invoking condition includes the following: an initiator user corresponding to the data read and write request has an invoking permission for the smart contract.

The system, apparatus, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPUs), an input/output interface, a network interface, and a memory.

The memory may include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by a computing device. Based on the description in the present specification, the computer-readable medium does not include transitory computer-readable media (transitory media), for example, a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing are feasible or can be advantageous.

Terms used in one or more embodiments of the present specification are merely used to describe specific embodiments, and are not intended to limit the one or more embodiments of the present specification. The terms "a" and "the" of singular forms used in one or more embodiments of the present specification and the appended claims are also intended to include plural forms, unless otherwise specified in the context clearly. It should also be understood that, the term "and/or" used here indicates and includes any or all possible combinations of one or more associated listed items.

It should be understood that although terms "first", "second", "third", etc. can be used in one or more embodiments of the present specification to describe various types of information, the information is not limited to these terms. These terms are only used to differentiate between information of the same type. For example, without departing from the scope of one or more embodiments of the present specification, first information can also be referred to as second information, and similarly, the second information can be referred to as the first information. Depending on the context, for example, the word "if" used here can be explained as "while", "when", or "in response to determining".

The previous descriptions are only example embodiments of one or more embodiments of the present specification, but are not intended to limit the one or more embodiments of the present specification. Any modification, equivalent replacement, improvement, etc. made without departing from the spirit and principle of the one or more embodiments of the present specification shall fall within the protection scope of the one or more embodiments of the present specification.

What is claimed is:

1. A computer-implemented method, comprising:
   identifying, by a blockchain node in a blockchain network, a data retrieving and recording request to invoke a first smart contract;
   obtaining, by the blockchain node and from the data retrieving and recording request, location information to locate a second smart contract;
   executing, by the blockchain node based on the location information, the second smart contract based on the location information to generate a transaction comprising information of the first smart contract for invoking the first smart contract;
   and
   parsing, by the blockchain node based on instructions comprised in the first smart contract, metadata comprised in the first smart contract to generate a parsing result, wherein the parsing result indicates a storage field corresponding to a target object in the data set; and
   implementing a data retrieving and recording operation based on the instructions comprised in the first smart contract on the target object in the storage field.

2. The computer-implemented method according to claim 1, further comprising:
   retrieving, by the blockchain node, input parameters comprised in a data invoking request, wherein the input parameters comprise the target object.

3. The computer-implemented method according to claim 1, wherein the data retrieving and recording operation comprises:
   retrieving a field value in the storage field; and
   returning the field value to a sender of the data invoking request.

4. The computer-implemented method according to claim 3, further comprising:
   retrieving, by the blockchain node, input parameters comprised in the data retrieving and recording request, wherein the input parameters comprise the target object and a target object value, and wherein the data retrieving and recording operation comprises updating the field value in the storage field based on the target object value before returning the field value to the sender.

5. The computer-implemented method according to claim 1, further comprising:
   responding, by the blockchain node, to the data retrieving and recording request in response to determining that the data retrieving and recording request satisfies an invoking condition of the first smart contract; and
   returning, by the blockchain node, target data to a sender of the data retrieving and recording request.

6. The computer-implemented method according to claim 5, wherein the invoking condition comprises the sender of the data retrieving and recording request possessing an invoking permission for the first smart contract.

7. A non-transitory, computer-readable medium storing one or more instructions executable by a computer system to perform one or more operations comprising:
   identifying, by a blockchain node in a blockchain network, a data retrieving and recording request to invoke a first smart contract;
   obtaining, by the blockchain node and from the data retrieving and recording request, location information to locate a second smart contract;

executing, by the blockchain node based on the location information, the second smart contract based on the location information to generate a transaction comprising information of the first smart contract for invoking the first smart contract; and parsing, by the blockchain node based on instructions comprised in the first smart contract, metadata comprised in the first smart contract to generate a parsing result, wherein the parsing result indicates a storage field corresponding to a target object in the data set; and implementing a data retrieving and recording operation based on the instructions comprised in the first smart contract on the target object in the storage field.

8. The non-transitory, computer-readable medium according to claim 7, the one or more operations further comprising:

retrieving, by the blockchain node, input parameters comprised in a data invoking request, wherein the input parameters comprise the target object.

9. The non-transitory, computer-readable medium according to claim 8, wherein the data retrieving and recording operation comprises:

retrieving a field value in the storage field; and returning the field value to a sender of the data invoking request.

10. The non-transitory, computer-readable medium according to claim 9, the one or more operations further comprising:

retrieving, by the blockchain node, input parameters comprised in the data retrieving and recording request, wherein the input parameters comprise the target object and a target object value, and wherein the data retrieving and recording operation comprises updating the field value in the storage field based on the target object value before returning the field value to the sender.

11. The non-transitory, computer-readable medium according to claim 7, the one or more operations further comprising:

responding, by the blockchain node, to the data retrieving and recording request in response to determining that the data retrieving and recording request satisfies an invoking condition of the first smart contract; and returning, by the blockchain node, target data to a sender of the data retrieving and recording request.

12. The non-transitory, computer-readable medium according to claim 11, wherein the invoking condition comprises the sender of the data retrieving and recording request possessing an invoking permission for the first smart contract.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:

identifying, by a blockchain node in a blockchain network, a data retrieving and recording request to invoke a first smart contract;

obtaining, by the blockchain node and from the data retrieving and recording request, location information to locate a second smart contract;

executing, by the blockchain node based on the location information, the second smart contract based on the location information to generate a transaction comprising information of the first smart contract for invoking the first smart contract; and parsing, by the blockchain node based on instructions comprised in the first smart contract, metadata comprised in the first smart contract to generate a parsing result, wherein the parsing result indicates a storage field corresponding to a target object in the data set; and implementing a data retrieving and recording operation based on the instructions comprised in the first smart contract on the target object in the storage field.

14. The computer-implemented system according to claim 13, the operations further comprising:

retrieving, by the blockchain node, input parameters comprised in a data invoking request, wherein the input parameters comprise the target object.

15. The computer-implemented system according to claim 14, wherein the data retrieving and recording operation comprises:

retrieving a field value in the storage field; and returning the field value to a sender of the data invoking request.

16. The computer-implemented system according to claim 15, the operations further comprising:

retrieving, by the blockchain node, input parameters comprised in the data retrieving and recording request, wherein the input parameters comprise the target object and a target object value, and wherein the data retrieving and recording operation comprises updating the field value in the storage field based on the target object value before returning the field value to the sender.

17. The computer-implemented system according to claim 13, the operations further comprising:

responding, by the blockchain node, to the data retrieving and recording request in response to determining that the data retrieving and recording request satisfies an invoking condition of the first smart contract; and returning, by the blockchain node, target data to a sender of the data retrieving and recording request.

* * * * *

UNITED STATES PATENT AND TRADEMARK OFFICE
CERTIFICATE OF CORRECTION

PATENT NO. : 11,200,226 B2
APPLICATION NO. : 17/161640
DATED : December 14, 2021
INVENTOR(S) : Benquan Yu et al.

It is certified that error appears in the above-identified patent and that said Letters Patent is hereby corrected as shown below:

In the Specification

Column 1, Line 8, delete "CN 2019" and insert -- CN2019 --.

Signed and Sealed this
Seventh Day of June, 2022

Katherine Kelly Vidal
*Director of the United States Patent and Trademark Office*